(12) United States Patent
Sundareson et al.

(10) Patent No.: US 11,176,967 B2
(45) Date of Patent: Nov. 16, 2021

(54) AUTOMATIC GENERATION OF VIDEO PLAYBACK EFFECTS

(71) Applicant: NVIDIA Corporation, Santa Clara, CA (US)

(72) Inventors: Prabindh Sundareson, Karnataka (IN); Prakash Yadav, Maharashtra (IN); Himanshu Bhat, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/928,222

(22) Filed: Jul. 14, 2020

(65) Prior Publication Data
US 2020/0411056 A1  Dec. 31, 2020

Related U.S. Application Data

(63) Continuation of application No. 16/527,963, filed on Jul. 31, 2019, now Pat. No. 10,741,215.
(Continued)

(51) Int. Cl.
*H04N 9/80* (2006.01)
*G11B 27/031* (2006.01)
(Continued)

(52) U.S. Cl.
CPC ........... *G11B 27/031* (2013.01); *A63F 13/23* (2014.09); *A63F 13/497* (2014.09);
(Continued)

(58) Field of Classification Search
CPC ......... H04L 67/38; H04L 67/22; H04L 65/60; G11B 27/031; G11B 27/34; G11B 27/005;
(Continued)

(56) References Cited

U.S. PATENT DOCUMENTS 9,242,176 B2   1/2016   Miura et al.
9,345,966 B2   5/2016   Miura et al.
(Continued)

OTHER PUBLICATIONS

Platzer, Christian. "Sequence-based bot detection in massive multiplayer online games." In 2011 8th International Conference on Information, Communications & Signal Processing, pp. 1-5. IEEE, 2011.
(Continued)

*Primary Examiner* — Robert Chevalier
(74) *Attorney, Agent, or Firm* — Shook, Hardy & Bacon L.L.P.

(57) ABSTRACT

In various examples, recordings of gameplay sessions are enhanced by the application of special effects to relatively high(er) and/or low(er) interest durations of the gameplay sessions. Durations of relatively high(er) or low(er) predicted interest in a gameplay session are identified, for instance, based upon level of activity engaged in by a gamer during a particular gameplay session duration. Once identified, different variations of video characteristic(s) are applied to at least a portion of the identified durations for implementation during playback. The recordings may be generated and/or played back in real-time with a live gameplay session, or after completion of the gameplay session. Further, video data of the recordings themselves may be modified to include the special effects and/or indications of the durations and/or variations may be included in metadata and used for playback.

20 Claims, 7 Drawing Sheets

Related U.S. Application Data

(60) Provisional application No. 62/868,654, filed on Jun. 28, 2019.

(51) Int. Cl.
| | | |
|---|---|---|
| *G11B 27/00* | (2006.01) | |
| *A63F 13/497* | (2014.01) | |
| *G11B 27/34* | (2006.01) | |
| *A63F 13/23* | (2014.01) | |
| *H04L 29/06* | (2006.01) | |
| *H04L 29/08* | (2006.01) | |

(52) U.S. Cl.
CPC ............ *G11B 27/005* (2013.01); *G11B 27/34* (2013.01); *H04L 65/60* (2013.01); *H04L 67/22* (2013.01); *H04L 67/38* (2013.01); *A63F 2300/1025* (2013.01); *A63F 2300/634* (2013.01)

(58) Field of Classification Search
CPC .......... G11B 27/28; A63F 13/44; A63F 13/69; A63F 13/23; A63F 13/86; A63F 13/497; A63F 2300/535; A63F 2300/634; A63F 2300/1025; H04N 21/8549
USPC .................................. 386/241, 248, 278, 326
See application file for complete search history.

(56) References Cited

U.S. PATENT DOCUMENTS

| | | | |
|---|---|---|---|
| 9,364,743 B2 | 6/2016 | Miura et al. | |
| 2008/0242425 A1* | 10/2008 | Isaka ..................... | A63F 13/12 463/42 |
| 2012/0100910 A1 | 4/2012 | Eichorn et al. | |
| 2015/0217196 A1 | 8/2015 | McCarthy et al. | |
| 2016/0059137 A1 | 3/2016 | Zahn et al. | |
| 2017/0282077 A1 | 10/2017 | De La Cruz | |
| 2019/0313024 A1 | 10/2019 | Selinger et al. | |
| 2019/0392866 A1* | 12/2019 | Yoon ..................... | G11B 27/031 |
| 2020/0155933 A1* | 5/2020 | Pierce .................... | A63F 13/77 |

OTHER PUBLICATIONS

Kaminsky, Ryan, Miro Enev, and Erik Andersen. "Identifying game players with mouse biometrics." University of Washington. Technical Report (2008).

Bernardi, Mario Luca, Marta Cimitile, Fabio Martinelli, and Francesco Mercaldo. "A time series classification approach to game bot detection." In Proceedings of the 7th International Conference on Web Intelligence, Mining and Semantics, p. 6. ACM, 2017.

"What influences keyboard input speed", May 31, 2018, https://blog.wooting.nl/whatinfluences-keyboard-speed/.

YouTube Player API Reference for iframe Embeds. Mar. 26, 2012, 43 pages. https://developers.google.com/youtube/iframe_api_reference.

XMP Specification Part 3, Storage in Files. Copyright 2016 Adobe Systems Incorporated, 80 pages. https://wwwimages2.adobe.com/content/dam/acom/en/devnet/xmp/pdfs/XMP%20SDK%20Release%20cc-2016-08/XMPSpecificationPart3.pdf.

GoPro Time Lapse: Beginners Guide (step by step) Video Tutorial, 2019, 40 pages. https://projectgo.pro/gopro-time-lapse/.

Non-Final Office Action dated Jun. 12, 2020 in U.S. Appl. No. 16/459,957.

Notice of Allowance dated Oct. 26, 2020 in U.S. Appl. No. 16/459,957, 5 pages.

Notice of Allowance dated Jan. 27, 2021 in U.S. Appl. No. 16/459,957, 5 pages.

Notice of Allowance dated Aug. 3, 2021 in U.S. Appl. No. 16/586,506, 7 pages.

* cited by examiner

AUTOMATIC GENERATION OF VIDEO PLAYBACK EFFECTS

CROSS-REFERENCE TO RELATED APPLICATIONS

This application is a continuation to U.S. patent application Ser. No. 16/527,963, entitled "Automatic Generation Of Video Playback Effects" filed Jul. 31, 2019 which claims priority to U.S. Provisional Patent Application No. 62/868,654, filed on Jun. 28, 2019, and entitled "Unsupervised Categorization of Gameplay Video Using Machine Learning Models". Each of these applications is incorporated herein by reference in its entirety.

BACKGROUND

Along with the growing availability of high-quality games, the generation and viewership of high-quality recordings of gameplay sessions, particularly with high-level players, also has seen significant growth. A typical gameplay session in modern action-oriented games (e.g., e-sports) can last several hours at a time, and unabridged recordings of even moderately lengthy game sessions can easily consume significant storage space (e.g., several Gigabytes). Moreover, potential viewers of gameplay session recordings may prefer not to view an unabridged recording, especially when durations of high(er) interest or activity (e.g., durations associated with a relatively high(er) level of action) are dispersed throughout the recording between durations of low(er) interest or activity (e.g., durations associated with a relatively low(er) level of action).

One conventional attempt at improving viewer engagement with gameplay session recordings is to use a video editor to manually customize such recordings for viewers, for example, to create an abridged recording collecting manually curated video clips having only highlights of gameplay sessions (e.g., containing only video clips of high(er)-action durations of the gameplay session). However, editing gameplay recordings in this manner requires significant time and resources on the part of the game player and/or the video publisher. Further, the video editing process can introduce significant delays between a live gameplay session and the availability of an edited recording for viewing. Additionally, for heavily edited sessions (e.g., videos that prioritize brevity), key information related to the gameplay session—such as user activities occurring during gameplay prior or subsequent to a manually selected video clip—is lost in a recording abridged in this manner. As a result, the abridged recording may not accurately reflect the gameplay experience related to the live gameplay session.

SUMMARY

Embodiments of the present disclosure relate to automatically applying special effects to high(er) and/or low(er)-interest durations of gameplay sessions. Systems and methods are disclosed that may, without human intervention, identify durations of high predicted interest in a gameplay session (e.g., durations associated with a high(er) level of action relative to other durations in the gameplay session) and/or durations of low predicted interest (e.g., durations associated with a relatively low(er) level of action when compared to other durations in the gameplay session), and apply different variations of one or more video characteristics to at least a portion of the identified durations for implementation during playback (e.g., identifying durations to be played back faster or slower than standard playback speed). Systems and methods further are disclosed that permit viewers of gameplay recordings to spend less time reviewing recordings of gameplay sessions but rather enjoy curated viewing of gameplay session recordings that convey a more accurate real-time gameplay experience than a series of video clips strung together and devoid of contextual information between such video clips.

In contrast to conventional systems, such as those described above, the present disclosure provides a mechanism for capturing the real-time experience of gameplay, and reflecting such real-time experience in differential encodings of gameplay sessions and/or differential replaying of gameplay session recordings. As utilized herein, "differential encoding" refers to encoding, into video data, indicators of different durations of a gameplay session to which different variations of one or more video characteristics (e.g., playback speed, image characteristic variation, addition of subtitle text, etc.) are to be applied. In some use cases, the different video characteristic variations also may be encoded into the video data along with the duration indicators. Similarly, as utilized herein, "differential replaying" refers to replaying different portions of a recording that correspond to different durations of a gameplay session with variations of video characteristic(s). Once durations of predicted high(er) and/or low(er) interest are identified, for instance, utilizing user interactions (e.g., hotkeys button actuation, mouse clicks, etc.) and/or other game events, vision-based techniques, audio-based techniques, statistical techniques, or various combinations thereof, the variations of the one or more video characteristics are applied to at least a portion thereof. In some embodiments, durations of predicted high(er) and/or low(er) interest and their corresponding interest levels may be used in real-time applications, such as to add special effects to the recording for streamed viewing during the live gameplay and/or for post-gameplay viewing. In some embodiments, durations of predicted high(er) and/or low(er) interest and their corresponding interest levels may be used in post-processing of a gameplay recording to automatically alter the recording itself or to customize playback of the recording.

BRIEF DESCRIPTION OF THE DRAWINGS

The present systems and methods for automatically applying special effects to high(er)- and/or low(er)-interest durations of gameplay sessions is described in detail below with reference to the attached drawing figures, wherein.

DETAILED DESCRIPTION

Figure 1:
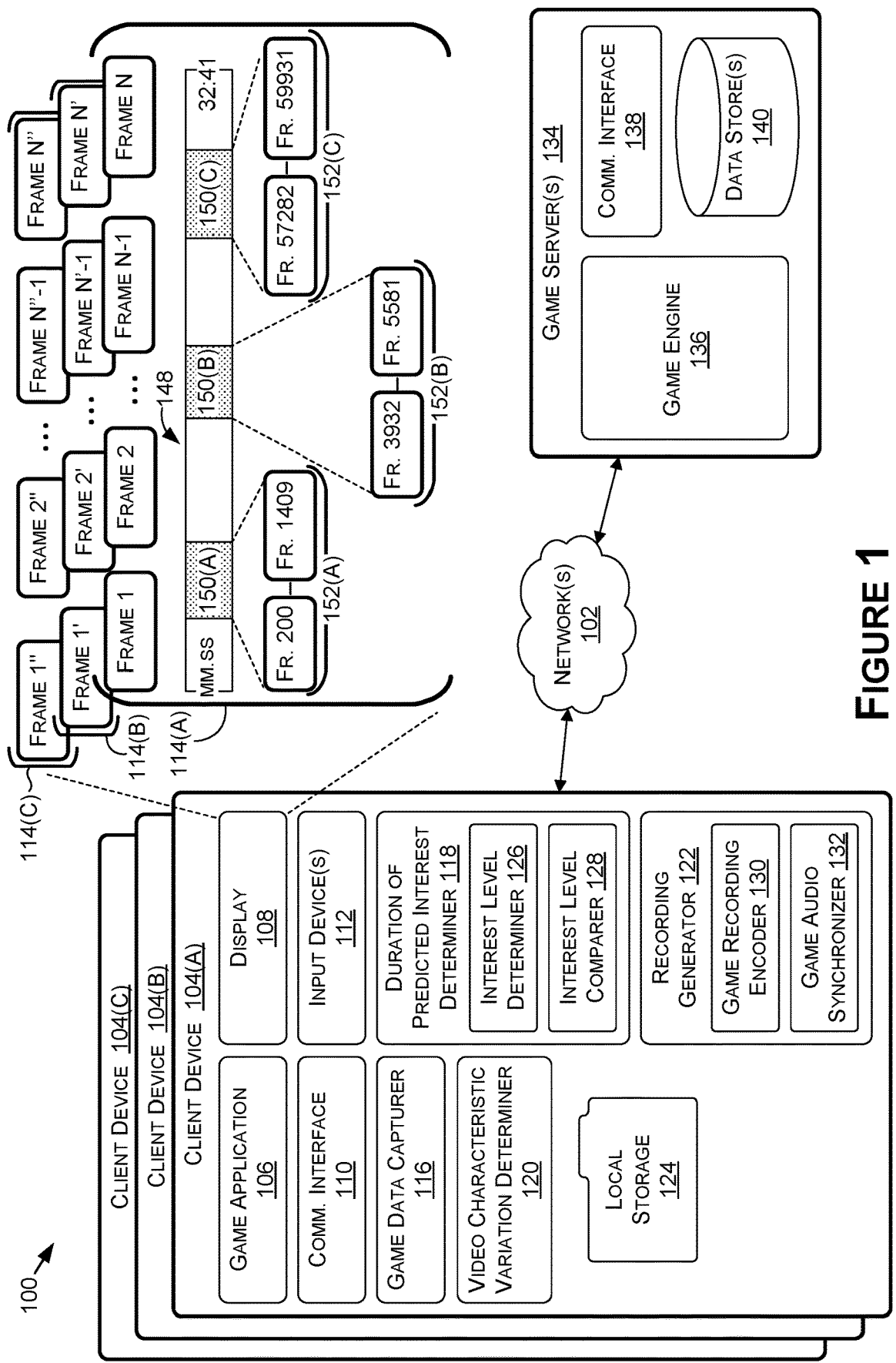
FIG. 1 is a system diagram of an exemplary system for automatically applying special effects to durations of predicted interest in gameplay sessions, in accordance with some embodiments of the present disclosure.

Systems and methods are disclosed related to automatically applying special effects to gameplay sessions during durations that are predicted to have high(er) and/or low(er) levels of interest or activity. In contrast to conventional systems, the present disclosure provides an approach for capturing the real-time experience of gameplay, and reflecting such real-time experience in differential encodings of gameplay sessions and/or differential replaying of gameplay session recordings.

As used herein, "differential encoding" refers to encoding video data of various durations of a gameplay session with different variations of one or more video characteristics (e.g., playback speed, image characteristics, etc.). The different video characteristic variations may be encoded into the video data itself and/or into metadata associated with the video data (e.g., using indicators in the metadata). Similarly, "differential replaying," as utilized herein, refers to replaying different portions of a gameplay session recording that correspond to different durations of the gameplay session with variations of video characteristic(s) applied to such durations. In some use cases, various durations to which different variations of video characteristic(s) are applied are identified based upon predicted viewer interest levels relative to other durations of the gameplay session.

Further, the disclosed technologies can automate such advanced encoding or replaying processes. Resultantly, it is not necessary for game players to manually select, annotate, or edit large video files. Instead, the disclosed technologies may be used to automatically (that is, without user intervention) identify durations of gameplay sessions that are predicted to be of high(er) interest to viewers relative to other durations of a gameplay session (e.g., those durations associated with a relatively high(er) level of action) or low(er) interest to viewers (e.g., those durations associated with a low(er) level of action relative to other durations of the gameplay session). The disclosed technologies further may be used to automatically apply different variations of one or more video characteristics to at least a portion of the identified durations for implementation during playback of a recording of the gameplay session (e.g., generating video clips with durations to be played back fast(er) or slow(er) than standard playback speed). As a result, viewers of a gameplay recording can spend less time reviewing gameplay recordings by enjoying curated viewing of gameplay sessions that convey a more accurate real-time gameplay experience than a series of video clips strung together and devoid of contextual information present between such video clips.

In some embodiments, the disclosed technologies automatically predict respective interest levels associated with durations of live gameplay sessions, and apply different variations of one or more video characteristics to at least a portion of such durations. By way of example, the disclosed technologies may encode a duration of a gameplay session that is predicted to have a high(er) interest level relative to other durations of the gameplay session with a variable frame rate. By way of another example, technologies disclosed herein may control the playback speed of durations of relatively high predicted interest (e.g., durations having a relatively high(er) action level relative to other durations of a gameplay session) so that the viewers of a gameplay session recording can appreciate the dynamic experience of the players during the live gameplay session and easily identify interesting or noteworthy sections of gameplay. As used herein, playback speed may be relative to the speed of the gameplay session and/or to the speed of the recording of the gameplay session. For example, when a low playback speed is encoded into to video data of a recording (e.g., by duplicating and/or interpolating frames to produce additional frames for a region of predicted interest), the low playback speed may be inherent in the video data and relative to the gameplay session. As another example, when the low playback speed is only encoded to metadata, the low playback speed may be captured by one or more indicators in the metadata and the frames of the video data may be unchanged to capture the low playback speed.

To these ends, at a high level, the disclosed technologies may automatically determine durations predicted to be of relatively high(er) and/or low(er) interest to viewers and their corresponding interest levels for a full gameplay session by analyzing data (e.g., video data and/or input-device data) that captures events of the gameplay session, and generate a recording that plays back at least a portion of the durations of predicted interest with variations in one or more video characteristics, e.g., based on their corresponding interest levels, such variations to be presented upon playback of the gameplay recording (e.g., in real-time or near-real-time with the gameplay session and/or afterwards).

As used herein, "duration of predicted interest" refers to an identified time-based segment of a gameplay session associated with an interest level (empirical or relative) that may be evaluated relative to interest levels associated with other time-based segments of the gameplay session and/or predetermined game-agnostic or game-specific threshold values. Thus, each of a "duration of high(er) predicted interest" and a "duration of low(er) predicted interest" is considered a "duration of predicted interest."

The analyzed data that captures events of the gameplay session may include, but is not limited to, audio and video information corresponding to the game or gameplay, user interactions with the game (e.g., keyboard events, mouse events, joystick events, etc.), player interactions (e.g., chats, messages, communications, etc.), and sensory input from the players (e.g., voice, motion, heart rate, expression, etc.). In some embodiments, user interactions (e.g., hotkeys button presses, mouse clicks, etc.) and/or other game events may be analyzed to identify durations of predicted interest and their corresponding interest levels. Vision-based techniques, audio-based techniques, statistical techniques, or various combinations thereof also may be used to identify durations of predicted interest. In some embodiments, information from a game screen may be collected via optical character recognition (OCR) or heads up display (HUD) analysis. In further examples, statistical analysis and/or computer vision techniques may be used for object detection or audio detection. Such useful information then may be used to heuristically determine whether a particular portion of a gameplay session is a duration of predicted interest of the gameplay as well as the interest level associated with the duration.

Further, a measure of user interaction during a time-based segment of a gameplay session may be used to identify both a duration of predicted interest and its corresponding interest level. In some embodiments, the measure of user interaction (or user input) may be derived from the player's input devices (such as a touchscreen, touchpad, keyboard, mouse, gamepad, joystick, microphone, or the like). The measure of user interaction may be used to identify a time-based segment of high(er) or low(er) user interaction and the intensity of such user interaction, which then can be interpreted as a duration of low or high predicted interest and a corresponding interest level determined. By way of example, the measure of user interaction (or user input) may correspond to an interest level and a duration of gameplay may be interpreted as a duration of high predicted interest when the interest level exceeds a game-agnostic or game-specific threshold value or a duration of low predicted interest when the interest level falls below a game-specific or game-agnostic threshold value. By way of another example, the measure of user interaction may correspond to an interest level and a duration of gameplay may be interpreted as a duration of high predicted interest when the interest level is high(er) relative to other durations in a gameplay session or low predicted interest when the interest level is low(er) relative to other durations in a gameplay session.

In general, durations of predicted interest and their corresponding interest levels may either be encoded into a recording of a gameplay session or may be captured as metadata to configure the playback of a gameplay session recording. By way of example, the variations to one or more video characteristics may be embedded (e.g., using an eXtensible Metadata Platform (XMP)) in video files of gameplay session recordings as metadata. By way of another example, an original, full gameplay session recording may be accompanied by a configuration file that comprises metadata capturing indicators of durations of predicted interest and/or corresponding variations to video characteristic(s), such as in a .xmp or .json sidecar, which then can be used by a custom video player (e.g., a video player having specialized playback software) to apply the special effects as defined in the configuration file. Video files having metadata embedded in this way, or accompanying the video file, will play back at normal playback speeds on video players lacking specialized playback software to appropriately interpret the metadata.

One approach for applying a variation of a video characteristic to particular durations of predicted interest is by modifying recorded video data of a gameplay session, either during real-time recording of the gameplay session or by processing a recording after completion of the gameplay session. Variations in video characteristics can include, by way of example only, fast motion playback, slow motion playback, and variable speed playback such as time-lapse and/or may be visualized as adjustments to image properties such as color, contrast, saturation, and/or brightness. As an example, the modified video data may still retain the original content; with the exceptions that slow motion is applied to durations having high(er) predicted interest levels, and fast motion may be applied to durations having low(er) predicted interest levels. In some use cases, if a high(er)-interest duration is determined to be present at time "t," the speed of playback may be iteratively increased (e.g., in any of a constant, variable, linear, logarithmic, or exponential manner) until the time "t," and then decreased, to provide a pleasing effect. In each variation, viewers can still view the full content of the gameplay session, such that the gameplay experience is accurately reflected, but with an emphasis on the highlights of the session.

In a real-time application, the presentation timestamp of a present frame to be recorded may be altered or adjusted, and a corresponding time-based duration determined, based on whether the frame is in a duration of high or low predicted interest. In such instances, as any variation in a video characteristic is recorded together with the gameplay, any media player can replay the recording with the variation in the video characteristic. Since audio information is time sensitive, audio information corresponding to the recorded video data may be separately synchronized with the variable speed playback, described in more detail below.

In a post-processing application, variations in video characteristics, such as slow motion or fast motion playback, may be accomplished by providing a modified timestamp for a selected frame or even each frame in the recording, e.g., through metadata in the header of the video file. For instance, such modification information may be embedded in the standard MPEG4 video file (MP4) as metadata in XMP or other format. In further examples, metadata indicating whereabouts of durations of predicted interest, playback speeds, transition effects, etc. may be stored in a configuration file, so that the unaltered recording may be played back with the intended modifications (e.g., special effects, playback only selected durations, etc.) based on the configuration file. For instance, the configuration file may accompany the video file in an extensible metadata platform (XMP) file, a JSON file, or in other formats. In any embodiment, the metadata may be provided and may be used by an application (e.g., a video player) to identify durations of predicted interest and/or corresponding variations to video characteristics. For example, where the variations are applied in the encoded video data of the recording, the metadata may be used by the application to identify durations of predicted interest and/or video characteristic variations, such as to display corresponding information to users and/or to allow for playback features such as duration selection.

With reference now to FIG. 1, an exemplary system 100 for automatically identifying durations of predicted interest and applying special effects to at least a portion of such durations is shown, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The special effects application system 100 includes, among other things, client devices 104(A), 104(B), and 104(C) (referred to collectively herein as "client devices 104"), and a game server 134. Although three client devices 104(A), 104(B), and 104(C) are illustrated in FIG. 1, this is not intended to be limiting. In any example, there may be any number of client devices 104. The special effects application system 100 (and the components and/or features thereof) may be implemented using one or more computing devices, such as the computing device 700 of FIG. 7, described in more detail below. Similarly, although a single game server 134 is illustrated in FIG. 1, this too is not intended to be limiting. In any example, there may be any number of game servers 134.

Components of the special effects application system 100 may communicate over network(s) 102. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the special effects application system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, and/or another type of device capable of supporting game play.

The client devices 104 include a game application 106, a display 108, a communication interface 110, an input device(s) 112, a game data capturer 116, a duration of predicted interest determiner 118, a video characteristic variation determiner 120, a recording generator 122, and local storage 124. Although only a few components and/or features of the client devices 104 are illustrated in FIG. 1, this is not intended to be limiting. For example, the client devices 104 may include additional or alternative components, such as those described below with respect to the computing device 700 of FIG. 7.

The game application 106 may be a mobile application, a computer application, a console application, and/or another type of application. The game application 106 may include instructions that, when executed by a processor(s), cause the processor(s) to, without limitation, receive input data representative of user inputs to the one or more input device(s) 112, transmit the input data to the game server(s) 134, retrieve game data from memory 140 or local storage 124, receive the game data using the communication interface 110 from the game server(s) 134, and cause display of the game data on the display 108. In other words, the game application 106 may operate as a facilitator for enabling playing of a game associated with the game application 106 on the client devices 104.

The game application 106 and/or patches or updates to the game application 106 may be downloaded from the game server(s) 134 or may be downloaded from another server(s) (not shown), such as a server of a content delivery network (CDN). For example, the game server(s) 134 may be located in a different country or on a different continent, so to reduce the download time, the game application 106 and/or the patches or updates may be stored on different servers around the globe. As such, when the client devices 104 are downloading the game application 106 and/or the patches or updates, the client devices 104 may connect to a more local server that is part of the CDN, for example.

In some examples, the client devices 104 may render the game using the game application 106, while in other examples, the client devices 104 may receive display data (e.g., encoded display data, as described with respect to FIG. 6) and use the display data to display the game on the display 108. In some examples, a first client device, such as client device 104(A), may render the game while a second client device, such as client device 104(B), may receive the display data and display the game using the display data. In examples where the display data is received by the client device (e.g., where the client device 104(A) does not generate the rendering), the special effects application system 100 may be part of a game streaming system, such as the game streaming system 600 of FIG. 6, described in more detail below.

The client device 104(A) may display, via the display 108, a plurality of gameplay sessions over time, such as a gameplay session 114(A), a gameplay session 114(B), and a gameplay session 114(C) (referred to collectively herein as "gameplay sessions 114"). The gameplay sessions 114 may include any number of gameplay sessions participated in by users of the client device 104(A). Similarly, users of each of the client devices 104, in addition to the client device 104(A), may participate in any number of gameplay sessions 114.

The display 108 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client devices 104.

The input device(s) 112 may include any type of devices that are capable of providing user inputs to the game. The input device(s) may include a keyboard, a mouse, a microphone(s), a touch-screen display, a controller(s), a remote(s), a headset (e.g., sensors of a virtual reality headset), and/or other types of input devices.

The communication interface 110 may include one or more components and features for communicating across one or more networks, such as the network(s) 102. The communication interface 110 may be configured to communicate via any number of network(s) 102, described herein. For example, to communicate in the special effects application system 100 of FIG. 1, the client devices 104 may use an Ethernet or Wi-Fi connection through a router to access the Internet in order to communicate with the game server(s) 134, and/or with other client devices 104.

The local storage 124 may include any of a variety of computer-readable media. The computer-readable media may be any available media that can be accessed by the client device 104(A). The computer-readable media may include both volatile and nonvolatile media, and removable and non-removable media. By way of example, and not limitation, the computer-readable media may comprise computer-storage media and communication media. The local storage 124 may include additional or alternative components, such as those described below with respect to the memory 704 of FIG. 7.

General operations of the system 100 have been described, including rendering of the gameplay sessions 114. Some additional aspects will now be described, including other operations that might be carried out in the course of rendering the gameplay sessions 114 or analyzing data generated as a result of the gameplay sessions 114. As described herein, gameplay-session video data (which also may be referred to as "gameplay video") from the gameplay sessions 114 may be used to generate video files (or portions of video files) associated with the gameplay sessions 114. Among other things, the gameplay-session video data might include a series of frames that, when sequentially played, provide a video replay of the respective gameplay session and/or one or more portions thereof.

For example, the gameplay session 114(A) includes Frames 1 through N, and each frame may represent a still image presented by the display 108 in the course of rendering the gameplay session 114(A). Furthermore, FIG. 1 illustrates a timeline 148 associated with the gameplay session 114(A) that indicates a relative time designation at which each frame of the gameplay session 114(A) may be sequentially positioned. For illustrative purposes, time segments 150(A), 150(B), and 150(C) are depicted on the timeline 148, and each time segment is depicted as being associated with a respective set of frames, which make up a respective video segment of the gameplay-session video data. For example, the time segment 150(A) is associated with frames 200 through 1409, which make up a video segment 152(A); the time segment 150(B) is associated with frames 3932 through 5581, which make up a video segment 152(B); and the time segment 150(C) is associated with frames 57282 through 59931, which make up a video segment 152(C). In some embodiments of the present disclosure, one or more of time segments 150(A), 150(B) and 150(C) may be durations of predicted interest.

The game application 106 and/or the game data capturer 116 may include instructions that, when executed, record gameplay-session video data (e.g., corresponding to Frames 1 through N) from gameplay sessions 114 and store the recorded gameplay-session video data locally on the client device 104 (e.g., in local storage 124) or transmit the recorded gameplay-session video data to the game server 134 to be stored in the data store(s) 140. In examples where the client device 104(A) does not generate the rendering (such as when the rendering is generated by the game streaming system 600 of FIG. 6, described in more detail below), the game streaming system 600 might record and store the gameplay-session video data or transmit the gameplay-session video data to the game server(s) 134 for storage in the data store(s) 140.

As explained herein, it may be desirable to identify durations of a gameplay session that include content that is of relatively high predicted interest (such as durations during which a relatively high(er) amount of user input is provided, durations during which a relatively high(er) amount of action is detected, or durations having a predicted interest level that meets, exceeds, or is below a predetermined threshold value that may be game-specific, game-agnostic, or game-session-specific) and/or durations that include content that is of relatively low predicted interest (such as durations during which a relatively low(er) amount of user input is provided, durations during which a relatively low(er) amount of action is detected, or durations having a predicted interest level that meets, exceeds, or is below a game-specific or game-agnostic threshold value). Identifying durations including content of relatively high(er) or relatively low(er) predicted interest, and/or content that meets or exceeds a game-specific or game-agnostic threshold value, might be useful in various contexts, such as when generating differential recordings to be shared or stored. As such, in further embodiments, the system 100 includes a game data capturer 116, which may be useful for identifying durations of predicted relatively high(er) or low(er) interest.

The game data capturer 116 may be part of the game application 106 or may be part of a separate application (e.g., one or more system services, programs, etc.). The game data capturer 116 may be a component of the input device(s) 112 or may be executed by some other component of the client devices 104. The game data capturer 116 may include instructions that, when executed by a processor(s), cause the processor(s) to, without limitation, record or log game data, such input-device usage data, video data, audio data and/or other data associated with a gameplay session. Exemplary input-device usage data includes data descriptive or representative of keyboard, mouse, or other input-device usage, and that is associated with one or more of the gameplay sessions 114. Examples of information that might be recorded include keyboard strokes, mouse clicks, mouse movement, microphone inputs, video-camera inputs, and/or inputs to the client devices 104 during the gameplay sessions 114. In addition, the game data capturer 116 may store timestamp information along with these inputs that correlates with timestamp information of the gameplay-session video data (e.g., along the timeline 148).

The duration of predicted interest determiner 118 is generally configured to analyze data of gameplay sessions (e.g., the gameplay sessions 114) to determine durations of predicted high(er) or low(er) interest to a viewer. This analysis may be performed on recorded game data (e.g., in the local storage 124), such as after completion of a gameplay session (e.g., the gameplay session 114(A)), and/or in real-time as a gameplay session is occurring. The duration of predicted interest determiner 118 may be part of the game application 106 or may be part of a separate application (e.g., one or more system services, programs, etc.). In some examples, the duration of predicted interest determiner 118 is part of the same application as the game data capturer 116.

To identify the durations of predicted high(er) interest, the duration of predicted interest determiner 118 may determine durations of high(er) action in the gameplay sessions as durations of relatively high(er) interest based on the gameplay data. High(er) action in this context may be determined empirically (e.g., as meeting or exceeding a game-specific or game-agnostic threshold value) or relatively (e.g., having high(er) action relative to other durations in the gameplay session.) For example, the game data of the gameplay sessions 114 may be used to identify time-based segments during the gameplay sessions 114 that include relatively high(er) action, and these durations or time-based segments may be referred to as "durations of predicted high interest." To identify durations of low(er) predicted interest, the duration of predicted interest determiner 118 may determine durations of low(er) levels of action in the gameplay sessions as durations of relatively low(er) interest based on the gameplay data. Low(er) levels of action in this context may be determined empirically (e.g., as meeting or exceeding a game-specific, game-agnostic, or game-session-specific threshold value) or relatively (e.g., having low(er) activity relative to other durations in the gameplay session.) For example, the game data of the gameplay sessions 114 may be used to identify time-based segments during the gameplay sessions 114 that include relatively low(er) levels of action, and these durations or time-based segments may be referred to as "durations of predicted low(er) interest." Durations of predicted high(er) interest and durations of predicted low(er) interest may collectively be referred to as "durations of predicted interest."

As illustrated, the duration of predicted interest determiner 118 includes an interest level determiner 126 and an interest level comparer 128. The interest level determiner 126 determines an empirical level of interest associated with a time-based segment of a gameplay session (e.g., gameplay session 114(A)). By way of example, the interest level determiner 126 may quantify particular user interactions with the game (e.g., keyboard events, mouse events, joystick events, etc.), player interactions (e.g., chats, messages, communications, etc.), and/or sensory input from the players (e.g., voice, motion, heart rate, expression, etc.) and assign an interest level to a duration or time-based segment of a gameplay session that includes such user interactions, player interactions, and/or sensory input. Once an interest level is assigned to a duration or time-based segment of a gameplay session, the interest level comparer 128 compares the assigned interest level to interest levels assigned to other durations or time-based segments of the gameplay session and/or to one or more game-specific or game-agnostic threshold values. Based upon this comparison, the time-based segment may be identified as a duration of predicted high interest or a duration of predicted low interest. Additionally or alternatively, the interest level(s) may be used to identify the duration or time-based segment (e.g., a start or end thereof), such as is described below using a running activity measurement over time. Where the threshold value is based on previous interest levels of the gameplay session, the interest level comparer 128 may perform the comparison by comparing the interest level with the threshold value, which may be based on previous interest levels in the session.

The duration of predicted interest determiner may use any number of methodologies to quantify interest levels corresponding to various durations of predicted interest. For instance, vision-based techniques, audio-based techniques, statistical techniques, or various combinations thereof may be used. In some embodiments, information from a game screen may be collected via optical character recognition (OCR) or heads up display (HUD) analysis. In further examples, statistical analysis and/or computer vision techniques may be used for object detection or audio detection. Such useful information then may be used to heuristically determine whether a particular time-based segment of a gameplay session is a duration of predicted high or low interest as well as the interest level associated with the duration.

As previously set forth, in some embodiments, user interactions with the game (e.g., keyboard events, mouse events, joystick events, etc.) may be utilized to identify durations of predicted interest and their corresponding interest levels. For example, a time-based segment within a gameplay session 114 may be identified by the duration of predicted interest determiner 118 as a predicted high(er) interest duration based at least in part on the time segment having high KPMs, a high percentage of action-key selections, and/or other input-device metrics. Further, these input-device metrics may be subjected to additional analysis in order to reduce potential noise when identifying high(er)-action time-based segments. For instance, an interest-level algorithm could be applied to the input-device metrics to translate the metrics into a running activity measurement over time. One such algorithm is a "HEAT" algorithm (High Energy Area Technique), which includes:

$$\text{HEAT} = \log(k*(A_{factor}*D)^2*K_c*S_{max}))$$

where,
Afactor—=High constant, if "Action" keys are present in the cycle. Else=1
D=Duration of "Fast Cycle"
Kc=# of keys in "Fast Cycle"
Smax=Max speed of press among keys in "Fast Cycle"
K=constant Based on values of the interest level algorithm over time (e.g., values of HEAT), time-based segments of a gameplay session (e.g., the gameplay session 114(A)) can be identified that correlate with potentially high(er) in-game activity. For example, a time-based segment having data points (e.g., continuously) above a game-specific, game-agnostic, or game-session-specific threshold (e.g., an average) may be identified as correlating with a potentially highlight-worthy duration of a gameplay session. A start of the time-based segment may be based on when the running activity measurement exceeds the game-specific, game-agnostic, or game-session-specific threshold and an end of the time-based segment may be based on when the running activity measurement falls below the game-specific, game-agnostic, or game-session-specific threshold. The duration of the gameplay session recording extending between the start and end of time-based segment may be defined as a duration of predicted high(er) interest. Similarly, a time-based segment having data points (e.g., continuously) below a game-specific or game-agnostic threshold (e.g., an average) may be identified as correlating with a potentially non-highlight-worthy duration or region of a gameplay session. A start of the time-based segment may be based on when the running activity measurement falls below the game-specific or game-agnostic threshold and an end of the time-based segment may be based on when the running activity measurement falls above the game-specific or game-agnostic threshold. The duration of the gameplay session recording extending between the start and end of time-based segment may be defined as a duration of predicted low(er) interest. As another example, the duration of predicted interest determiner 118 may identify durations of predicted high(er) interest and consider or treat any other portions of the game session a duration of predicted low(er) interest, or vice versa. In examples, the duration of predicted high or low(er) interest may be stored as a discrete file that captures the frames spanning the time segment 150A, and/or may be stored as metadata used to identify a region or duration in the gameplay-session video data that corresponds to the time segment 150A (e.g., using a start timestamp, and end timestamp, and/or a time duration).

As described herein, in examples where the data for presentation is received by the client device (e.g., where the client device 104(A) does not generate the rendering), the special effects application system 100 may be part of a game streaming system, such as the game streaming system 600 of FIG. 6, described in more detail below. In those embodiments, the client device(s) 104 sends at least some of the user input to the game server(s) 134 in order to control the game(s) during the gameplay session(s) 114. Also, in some embodiments, the duration of predicted interest determiner 118 and/or the game data capturer 116 may be executed at least partially on the game server(s) 134. Here, the duration of predicted interest determiner 118 and/or the game data capturer 116 may perform the same or similar operations described with respect to the client-side. For example, on the server-side, the game data capturer 116 may log user input data and the duration of predicted interest determiner 118 may determine time-based segments identified as durations of predicted interest.

Once the time-based segments are identified as durations of predicted interest, corresponding video segments from the video data of gameplay sessions 114 can be identified. It is noted that a complete duration of predicted interest and/or segment need not be identified. For example, in real-time applications, a start of a duration of predicted interest may be identified before gameplay reaches an end of the duration of predicted interest. In various examples, the duration of predicted interest determiner 118 can transmit timestamps, which correspond to the durations of predicted interest, to the game application 106 and/or the game server(s) 134. Any combination of these components then may use the timestamps to generate and/or identify discrete video clips from the gameplay-session video data described above (e.g., stored in local storage 124 or data store(s) 140). For example, if a time segment that is identified as a duration of predicted interest corresponds with the time segment 150A, then a discrete video clip including the frames 200 through 1409 (or a copy thereof) may be created, and the discrete video clip may correspond with the video segment 152A. The generated video clips may be based on the durations of predicted interest where the generated video clips correspond with time-based segments during which the in-game activity was deemed relatively high(er) or relatively low(er) (e.g., as compared with other time segments during the gameplay session) or based on interest levels meeting, exceeding, or falling below predetermined game-specific or game-agnostic threshold values.

Once at least one duration of predicted (high(er) or low(er)) interest is determined or identified, at least one variation in one or more video characteristics to be applied to such duration(s) upon gameplay video playback are determined by the video characteristic variation determiner 120. In some use cases, the video characteristic variation determiner 120 may apply a set of instructions defining conditions under which various video characteristic variations are to be applied to the durations of predicted interest. By way of example, the video characteristic variation determiner 120 may apply instructions specifying that time-based segments identified as durations of predicted high(er) interest be played back at a speed slow(er) than standard playback speed and that time-based segments identified as durations of predicted low(er) interest be played back at a speed faster than standard playback speed. For instance, the video characteristic variation determiner 120 may apply instructions specifying that standard video characteristic settings be applied to at least some durations of predicted interest.

In various embodiments, the video characteristic variation determiner 120 may select a video characteristic(s) that is modified and/or the variation to the video characteristic(s) based at least in part on the interest level(s) associated with a duration of predicted interest. For example, a degree of the variation of the video characteristic may correspond to a magnitude of the interest level(s) associated with the duration and/or whether the interest level(s) fell below or above the threshold value. In some examples, the degree may be based on an average or other statistic (e.g., of part of the duration or the complete duration). For example, a high(er) interest level may cause a greater or lesser variation. This approach may be used to, for example, have the playback speed increase with decreasing interest levels in a gameplay session or decrease with increasing interest levels in the gameplay session (or otherwise provide a dynamic special effect and/or a special effect customized to a particular duration).

In some use cases, once an indicator of duration(s) of predicted interest (as well as variation(s) of one or more video characteristics to be applied to at least a portion of the durations of predicted interest) are determined, the recording generator 122 encodes duration and/or video-characteristic-variation indicators into recording(s) of the gameplay sessions (e.g., the gameplay sessions 114) and/or captures duration and video-characteristic-variation indicators as metadata to configure the playback of gameplay session recording(s). By way of example, the variations to one or more video characteristics may be embedded (e.g., using .xmp) in video files of gameplay session recordings as metadata. By way of another example, an original, full gameplay session recording may be accompanied by a configuration file that comprises metadata capturing indicators of durations of predicted interest and/or corresponding variations to video characteristic(s), such as in a .xmp or .json sidecar, which then can be used by a custom video player (e.g., a video player having specialized playback software) to apply the special effects as defined in the configuration file. Video files having metadata embedded in this way, or accompanying the video file, will play back at normal playback speeds on video players lacking specialized playback software to appropriately interpret the metadata.

In some use cases, durations of predicted interest and their corresponding interest levels are used in real-time (or near-real-time) applications, such as to add special effects to the gameplay session recording during live gameplay for streamed viewing during the live gameplay and/or for post-gameplay viewing. In some use cases, durations of predicted interest and their corresponding interest levels are used in post-processing of a gameplay recording to automatically alter the recording itself or to customize playback of the gameplay session recording.

One approach for applying a variation of a video characteristic to one or more particular durations of predicted interest is by the game recording encoder 130 modifying video data (e.g., the display data) of a gameplay session (e.g., the gameplay session 114(A)), either during real-time recording of the gameplay session or by processing a recording after completion of the gameplay session. Non-limiting examples of variations in video characteristics can include, fast motion playback, slow motion playback, variable speed playback such as time-lapse, and/or may be to image properties such as color, contrast, saturation, and/or brightness. As an example, the modified video data may still retain all of the original content. However, slow motion effects may be applied to durations having high(er) predicted interest levels; conversely, fast motion effects may be applied to durations having low(er) predicted interest levels. In some use cases, if a high(er)-interest duration is determined to be present (e.g., a start or an end of the region) at time "t," the speed of playback may be ramped in a linear manner from slow to fast, until the time "t," and then ramped down linearly, to provide a pleasing effect. Other types of transitions between regions may similarly be applied. In some embodiments, viewers can still view the full content of the gameplay session, such that the gameplay experience is accurately reflected, but with an emphasis on the highlights of the session.

Figure 2:
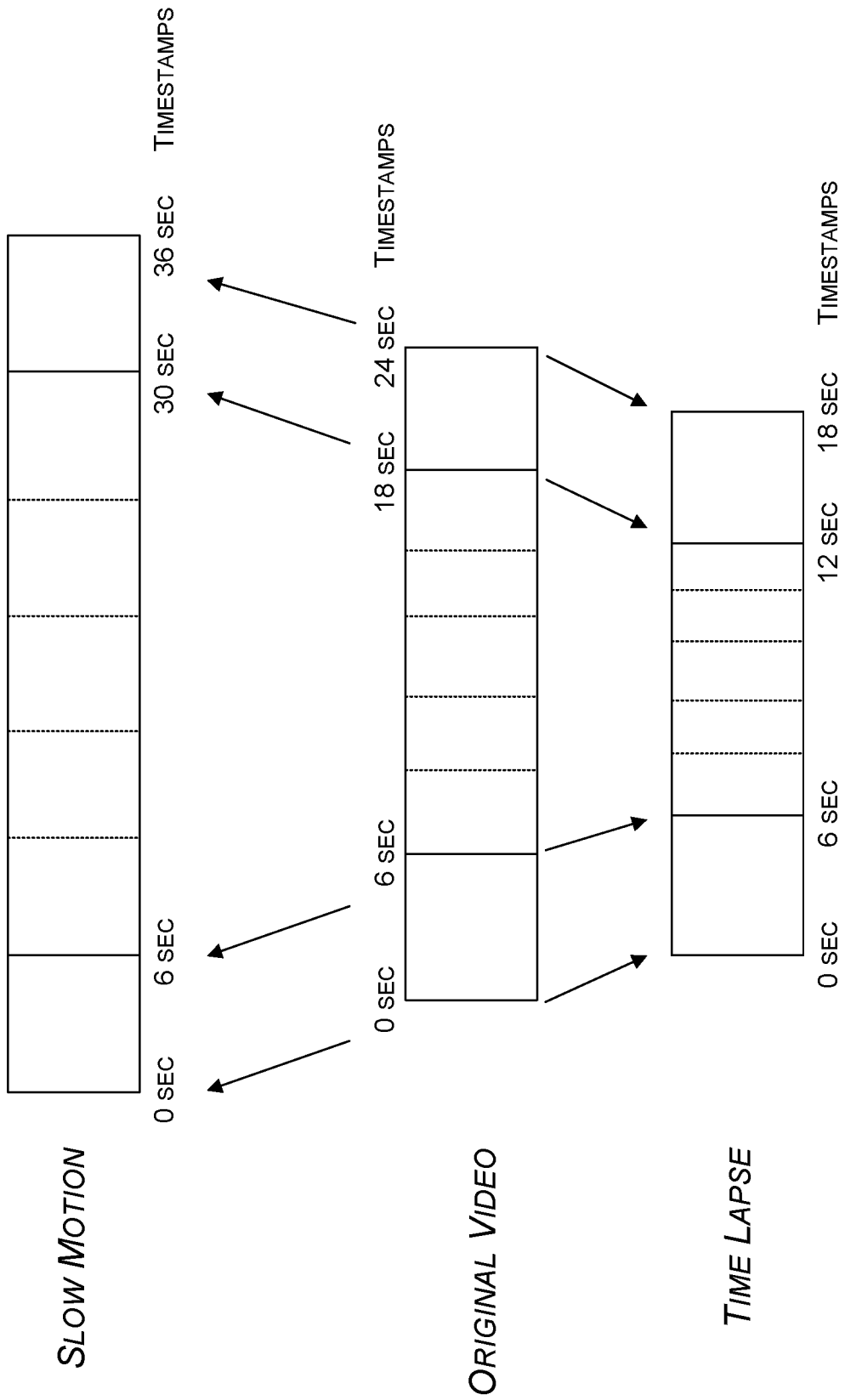
FIG. 2 is a block diagram illustrating timestamp alteration of video data that be utilized in applying special effects to durations of predicted interest, in accordance with some embodiments of the present disclosure.

In a real-time application, the presentation timestamp of a present frame to be recorded may be altered or adjusted (e.g., using a video buffer to temporarily store some of the recent video data), and a corresponding time-based duration determined, based on whether the frame is in a duration of high or low predicted interest. This is illustrated in FIG. 2 which is a block diagram illustrating timestamp alteration of video data that be utilized in applying special effects to durations of predicted interest, in accordance with some embodiments of the present disclosure. FIG. 2 illustrates an original video having standard timestamps associated therewith, as well as altered or adjusted timestamps to indicate slow motion playback or time lapse playback. In such instances, as any variation in a video characteristic may be associated or recorded together with the gameplay, any media player can replay the recording with the variation in the video characteristic. Since audio information is time sensitive, audio information corresponding to the recorded video data may be separately synchronized with the variable speed playback, by the game audio synchronizer 132.

In a post-processing application, variations in video characteristics, such as slow motion or fast motion playback effects, may be accomplished by providing a modified timestamp for a selected frame or even each frame in the recording, e.g., through metadata in the header of the video file. For instance, such modification information may be embedded in the standard MPEG4 video file (MP4) as metadata in XMP or other format. In further examples, metadata indicating whereabouts of durations of predicted interest, playback speeds, transition effects, etc. may be stored in a configuration file, so that the unaltered recording may be played back with the intended modifications (e.g., special effects, playback only selected durations, etc.) based on the configuration file. For instance, the configuration file may accompany the video file in an extensible metadata platform (XMP) file, a JSON file, or in other formats. In any embodiment, the metadata may be provided and may be used by an application (e.g., a video player) to identify durations of predicted interest and/or corresponding variations to video characteristics. For example, where the variations are applied in the encoded video data of the recording, the metadata may be used by the application to identify durations of predicted interest and/or video characteristic variations, such as to display corresponding information (e.g., notifications) to users and/or to allow for playback features such as duration selection.

Figure 3:
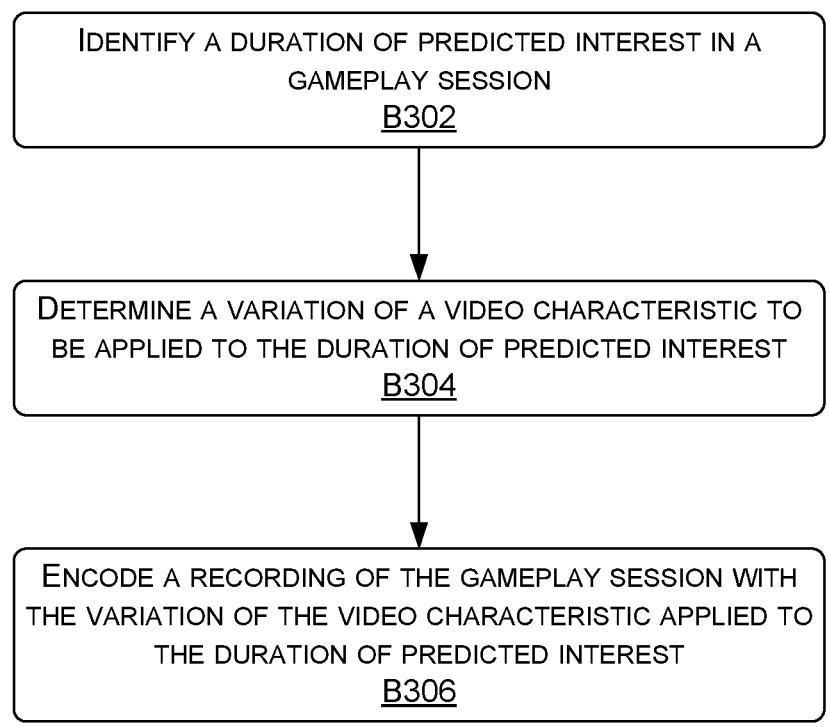
FIG. 3 is a flow diagram showing an exemplary method for encoding a recording of a gameplay session with variations of video characteristic(s) applied to a duration of predicted interest, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIG. 1. However, this method may additionally or alternatively be executed by any one system, or any combination of systems, including, but not limited to, those described herein. For instance, there may be a configuration block that specifies the type of analysis, the type of video processing, and/or other details.

FIG. 3 is a flow diagram showing a method 300 for encoding a recording of a gameplay session with variations of video characteristics applied to a duration of predicted interest, in accordance with some embodiments of the present disclosure. The method 300, at step B302, includes determining, at least in part from video data corresponding to a gameplay session, a duration of predicted interest in the gameplay session. The video data may be a video game or may include some other content, such as live or recorded sporting events, board games or card games, or other streamed or pre-recorded content. In some use cases, the duration of predicted interest corresponds to input provided by a user via one or more input devices (e.g., the input devices 112 of the client devices 104 of FIG. 1) during the gameplay session. As previously set forth, the duration of predicted interest may be determined by the duration of predicted interest determiner 118 of the client devices 104 of FIG. 1, or by some similar module of a set-top box or other streaming device.

At step B304, a variation of a video characteristic to be applied to the duration of predicted interest is determined. By way of example and not limitation, the video characteristic to be applied to the duration of predicted interest may be a playback speed of the recording, and the variation may be a change in the playback speed (e.g., if a duration of predicted interest is determined (e.g., at step B302) to be a duration of relatively high(er) interest, a playback speed that is slow(er) than standard playback speed may be applied thereto). As previously set forth, the variation of the video characteristic may be determined by the video characteristic variation determiner 120 of the client devices 104 of FIG. 1.

Step B306 includes encoding a recording of the gameplay session with the variation of the video characteristic applied to the duration of predicted interest. By way of example, a duration of gameplay determined to have a relatively low(er) interest level may be encoded with a variable frame rate such that a recording thereof may be played back at a speed that is faster than standard playback speed. As previously set forth, the recording may be encoded with the variation of the video characteristic applied to the duration of predicted interest by the recording generator 122 of the client devices 104 of FIG. 1.

Figure 4:
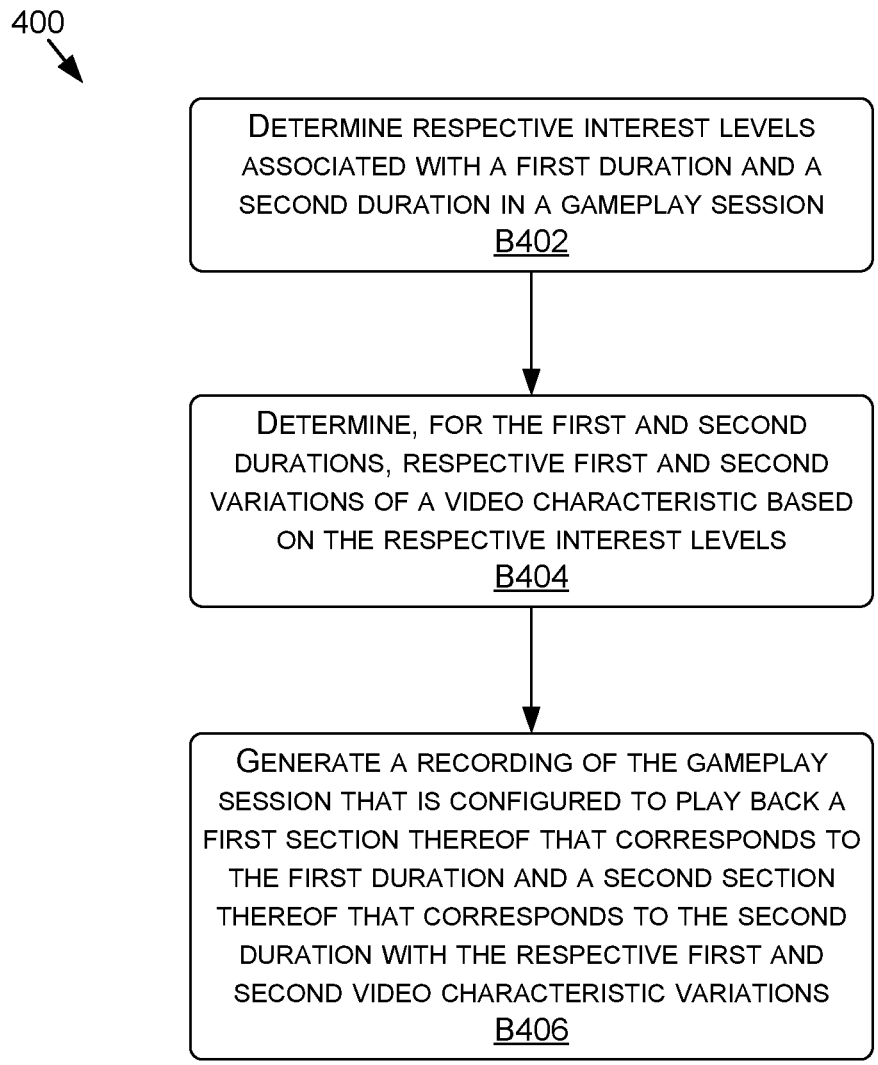
FIG. 4 is a flow diagram showing an exemplary method for generating a recording of a gameplay session that is configured for differential playback corresponding to various durations of predicted interest, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIG. 1. However, this method may additionally or alternatively be executed by any one system, or any combination of systems, including, but not limited to, those described herein. For instance, there may be a configuration block that specifies the type of analysis, the type of video processing, and/or other details.

FIG. 4 is a flow diagram showing a method 400 for generating a recording of a gameplay session that is configured for differential playback corresponding to various durations of interest, in accordance with some embodiments of the present disclosure. The method 400, at step B402, includes determining, at least in part from video data corresponding to a gameplay session, respective interest levels associated with a first duration in the gameplay session and a second duration in the gameplay session. The video data may be a video game or may include some other content, such as live or recorded sporting events or other streamed or pre-recorded content. In some use cases, the respective interest levels associated with the first and second durations in the gameplay session correspond to input provided by a user via one or more input devices (e.g., the input devices 112 of the client devices 104 of FIG. 1) during the gameplay session. As previously set forth, the respective interest levels may be determined by the interest level determiner 126 of the client devices 104 of FIG. 1, or by some similar module of a set-top box or other streaming device.

At step B404, it is determined, for the first duration in the gameplay session and the second duration in the gameplay session, respective first and second variations of a video characteristic based on the respective interest levels. By way of example and not limitation, the video characteristic to be applied to the duration of predicted interest may be a playback speed of the recording, and the variation may be a change in the playback speed (e.g., if a high(er) interest level is determined for the first duration in the gameplay session (e.g., at step B402), a playback speed that is slow(er) than standard playback speed may be determined to be applied thereto). As previously set forth, the respective variations of the video characteristic may be determined by the video characteristic variation determiner 120 of the client devices 104 of FIG. 1.

Step B406 includes generating a recording of the gameplay session. The recording is configured to play back a first section of the recording that corresponds to the first duration in the gameplay session and a second section of the recording that corresponds to the second duration in the gameplay session with the respective first and second variations of the video characteristic. As previously set forth, the recording of the gameplay session may be generated by the recording generator 122 of the client devices 104 of FIG. 1. In some use cases, there may be an intermediate step where a preview is presented to the user, the preview showing the recording annotated with the identified duration(s) such that the user may accept or over-ride the durations with different durations of interest.

Figure 5:
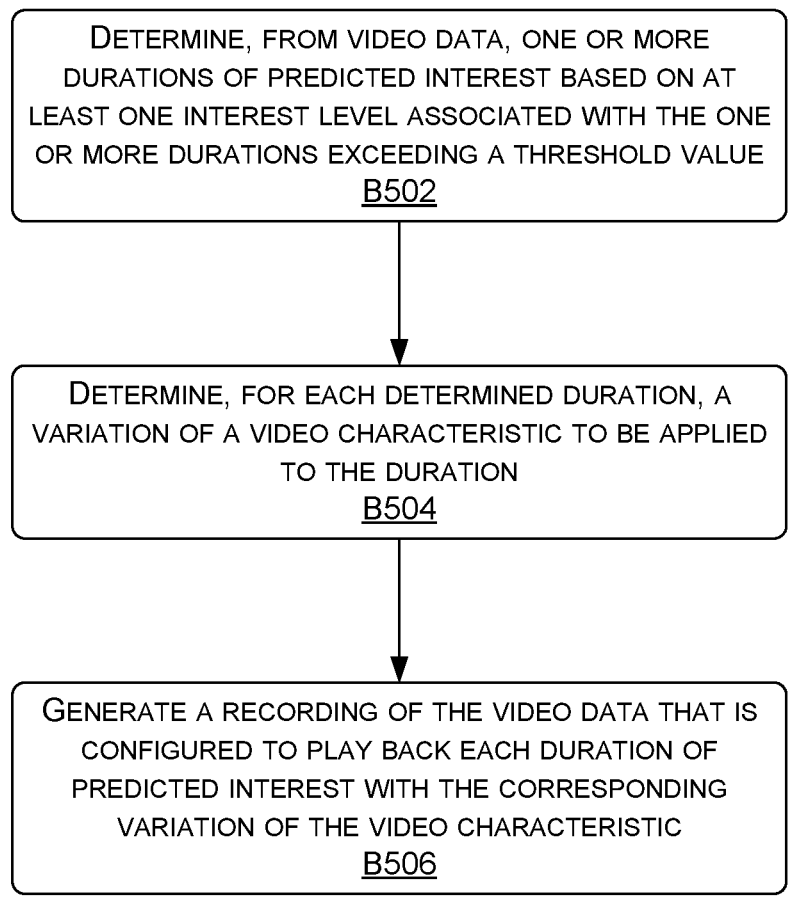
FIG. 5 is a flow diagram showing an exemplary method for generating a recording of video data that is configured to play back various durations of predicted interest with corresponding variations in video characteristic(s), in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system of FIG. 1. However, this method may additionally or alternatively be executed by any one system, or any combination of systems, including, but not limited to, those described herein. For instance, there may be a configuration block that specifies the type of analysis, the type of video processing, and/or other details. FIG. 5 is a flow diagram showing a method 500 for generating a recording of video data that is configured to play back various durations of predicted interest with corresponding variations in video characteristics, in accordance with some embodiments of the present disclosure. The method 500, at step B502, includes determining, at least in part from video data, one or more durations of predicted interest, the determining being based on at least one interest level associated with the one or more durations exceeding a game-specific or game-agnostic threshold value. The video data may be a video game or may include some other content, such as live or recorded sporting events or other streamed or pre-recorded content. In some use cases, the interest level corresponds to input provided by a user via one or more input devices (e.g., the input devices 112 of the client devices 104 of FIG. 1) during a gameplay session. As previously set forth, the interest level may be determined by the interest level comparer 128 of the client devices 104 of FIG. 1, or by some similar module of a set-top box or other streaming device.

At step B504, for each duration of the one or more durations of predicted interest, a variation of a video characteristic to be applied to the duration is determined. By way of example and not limitation, the video characteristic to be applied to the one or more durations of predicted interest may be a playback speed of the recording, and the variation may be a change in the playback speed (e.g., if a duration of predicted interest is determined (e.g., at step B502) to be a duration of relatively high(er) interest, a playback speed that is slow(er) than standard playback speed may be applied thereto). As previously set forth, the variation of the video characteristic may be determined by the video characteristic variation determiner 120 of the client devices 104 of FIG. 1.

Step B506 includes generating a recording of the video data that is configured to play back each duration of the one or more durations of predicted interest with the corresponding variation of the video characteristic. As previously set forth, the recording of the video data may be generated by the recording generator 122 of the client devices 104 of FIG. 1. In some use cases, there may be an intermediate step where a preview is presented to the user, the preview showing the recording annotated with the identified duration(s) such that the user may accept or over-ride the durations with different durations of interest.

Figure 6:
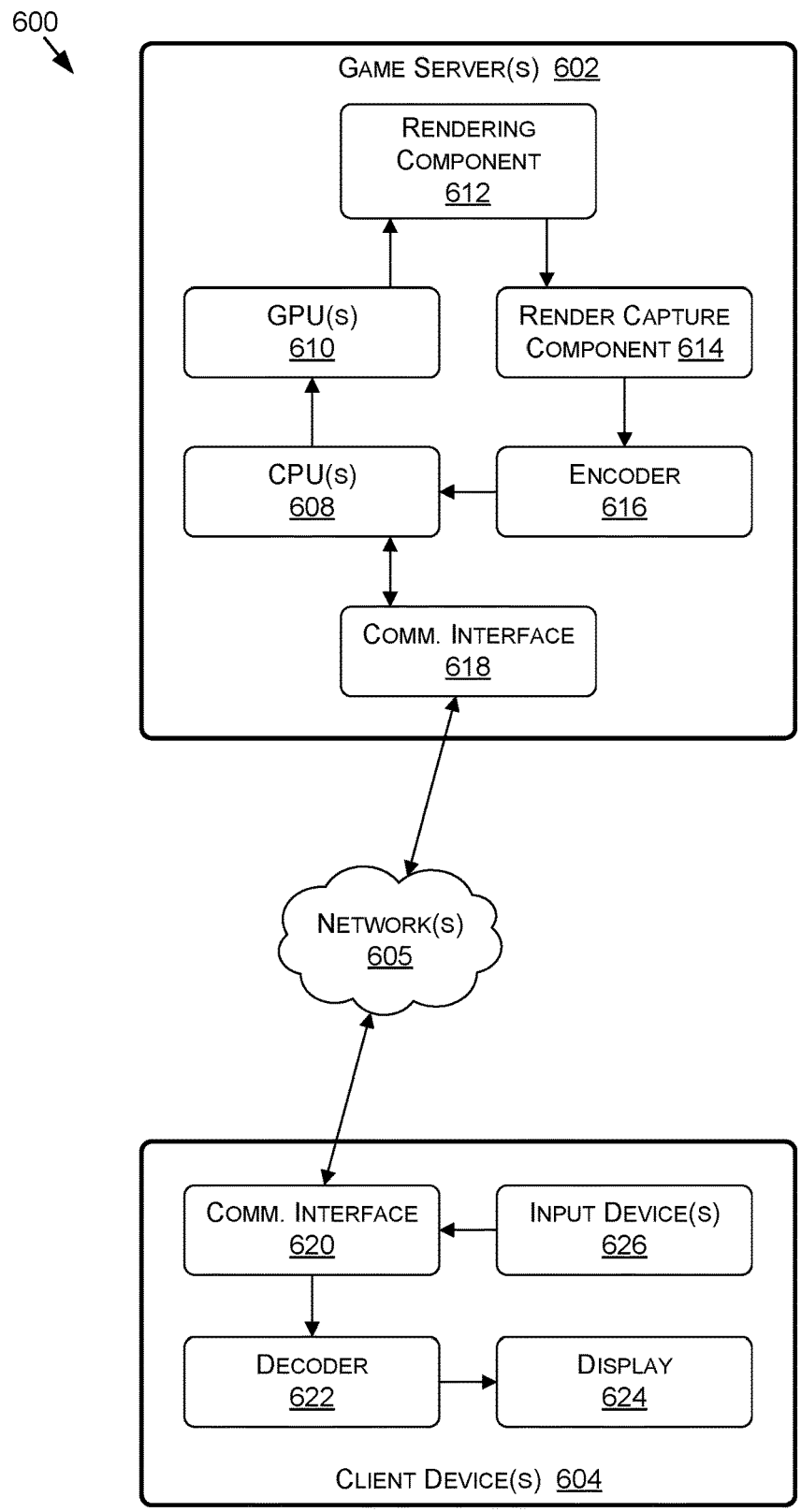
FIG. 6 is an exemplary system diagram for a game streaming system, in accordance with some embodiments of the present disclosure.

Now referring to FIG. 6, an exemplary system diagram for a game streaming system 600 is shown, in accordance with some embodiments of the present disclosure. FIG. 6 includes game server(s) 602 (which may include similar components, features, and/or functionality to the game server(s) 134 of FIG. 1 and/or the computing device 700 of FIG. 7, more fully described below), client device(s) 604 (which may include similar components, features, and/or functionality to the client devices 104 of FIG. 1 and/or the computing device 700 of FIG. 7, more fully described below), and network(s) 606 (which may be similar to the network(s) 102 of FIG. 1). In some embodiments of the present disclosure, the system 600 may be implemented.

In the system 600, for a gameplay session, the client device(s) 604 may only receive input data in response to inputs to the input device(s), transmit the input data to the game server(s) 602, receive encoded display data from the game server(s) 602, and display the display data on the display 624. As such, he more computationally intense computing and processing is offloaded to the game server(s) 602 (e.g., rendering of the gameplay session is executed by the GPU(s) of the game server(s) 602). In other words, the gameplay session is streamed to the client device(s) 604 from the game server(s) 602, thereby reducing the requirements of the client device(s) 604 for graphics processing and rendering.

For example, with respect to an instantiation of a gameplay session, a client device 604 may be displaying a frame of the gameplay session on the display 624 based on receiving the display data from the game server(s) 602. The client device 604 may receive an input to one of the input device(s) 626 and generate input data in response. The client device 604 may transmit the input data to the game server(s) 602 via the communication interface 620 and over the network(s) 606 (e.g., the Internet), and the game server(s) 602 may receive the input data via the communication interface 618. The CPU9s) may receive the input data, process the input data, and transmit data to the GPU9s) that causes the GPU(s) to generate a rendering of the gameplay session. For example, the input data may be representative of a movement of a character of the user in a game, firing a weapon, reloading, passing a ball, turning a vehicle, etc. The rendering component 612 may render the gameplay session (e.g., representative of the result of the input data) and the render capture component 614 may capture the rendering of the gameplay session as display data (e.g., as image data capturing the rendered frame of the gameplay session). The encoder 616 then may encode the display data to generate encoded display data and the encoded display data may be transmitted to the client device 604 over the network(s) 606 via the communication interface 618. The client device 604 may receive the encoded display data via the communication interface 620 and the decoder 622 may decide the encoded display data to generate the display data. The client device 604 then may display the display data via the display 624.

Figure 7:
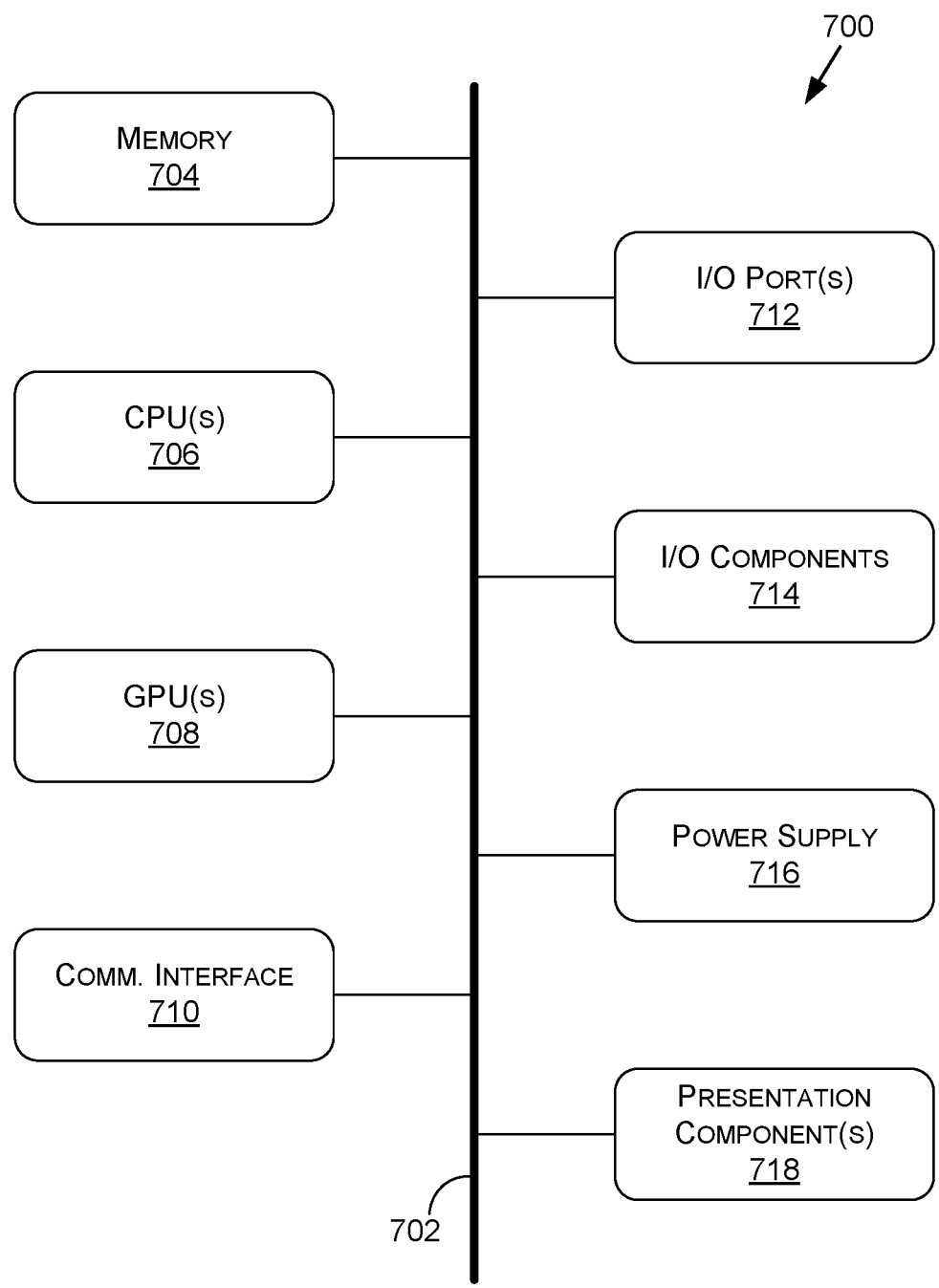
FIG. 7 is a block diagram of an exemplary computing environment suitable for use in implementing some embodiments of the present disclosure.

FIG. 7 is a block diagram of an example computing device 700 suitable for use in implementing some embodiments of the present disclosure. The computing device 700 includes a bus 702 that directly or indirectly couples the following devices: a memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The present disclosure may be practiced in a variety of system configurations, including hand-held devices, consumer electronics, general-purpose computers, more specialty computing devices, etc. The present disclosure also may be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
    determining, at least in part from data corresponding to a gameplay session, a duration of predicted interest in the gameplay session;
    determining a variation of a video characteristic to be applied to the duration of predicted interest; and
    storing, in metadata of video data of the gameplay session, an indicator of the duration of predicted interest in association with a corresponding section of the video data based at least on part on the determining of the variation.

2. The method of claim 1, further comprising transmitting, using at least one cloud server, the metadata to one or more client devices during the gameplay session in association with a video stream of the gameplay session.

3. The method of claim 1, wherein the metadata is stored in a header of a video file that comprises the video data.

4. The method of claim 1, further comprising generating the corresponding section of the video data with the variation of the video characteristic.

5. The method of claim 1, wherein the gameplay session is of a game and the determining the duration of predicted interest is based at least on analyzing input-device data representing input by a client device to the game using one or more of a keyboard, a mouse, a microphone, a game-console controller, or a touchscreen.

6. The method of claim 1, wherein the video characteristic comprises a playback speed of the recording, and the variation comprises a change in the playback speed.

7. The method of claim 1, comprising:
    analyzing one or more of a video or device inputs associated with the gameplay session to determine an interest level corresponding to the duration of predicted interest; and
    determining the interest level exceeds a threshold value, wherein the determining the duration of predicted interest is based at least on the interest level exceeding the threshold value.

8. The method of claim 1, comprising:
    analyzing one or more of the video of device inputs associated with the gameplay session to determine a first interest level corresponding to the duration of predicted interest;
    analyzing the one or more of the video or device inputs to determine a second interest level corresponding to a duration of the gameplay session that is different than the duration of predicted interest; and
    determining the first interest level exceeds the second interest level, wherein the determining the duration of predicted interest is based on the first interest level exceeding the second interest level.

9. The method of claim 1, further comprising analyzing one or more of video or device inputs associated with the gameplay session to determine an interest level corresponding to the duration of predicted interest, wherein a degree of the variation of the video characteristic corresponds to a magnitude of the interest level.

10. The method of claim 1, wherein the metadata is configured to cause play back of each duration of a plurality of durations of predicted interest in the gameplay session with corresponding variations of the video characteristic.

11. A computer-implemented method comprising:
determining, at least in part from data corresponding to a gameplay session, one or more interest levels associated with one or more durations in the gameplay session;
determining a variation of a video characteristic for a duration of the one or more durations based at least on the one or more interest levels; and
storing, in metadata of video data of the gameplay session, an indicator of an association between the duration in the gameplay session and the variation of the video characteristic.

12. The method of claim 11, wherein the metadata further indicates a location that corresponds to the duration in a video represented by the video data.

13. The method of claim 11, further comprising generating a section of the video data that corresponds to the duration with the variation of the video characteristic.

14. The method of claim 11, wherein the metadata is stored in a configuration file associated with a video file that comprises the video data.

15. The method of claim 11, wherein the video characteristic comprises a playback-speed of the video data.

16. A computer-implemented system comprising:
one or more processing devices and one or more memory devices communicatively coupled to the one or more processing devices storing programmed instructions thereon, which when executed by the one or more processing devices causes performance of a method comprising:
determining, using at least one cloud server, one or more durations of predicted interest at least in part from data corresponding to a video, the determining being based at least on an interest level associated with the one or more durations;
determining, using the at least one cloud server, for each duration of the one or more durations of predicted interest, a variation of a video characteristic;
generating, using the at least one cloud server, metadata of video data corresponding to the video, the metadata configured to cause play back of each duration of the one or more durations of predicted interest with the corresponding variation of the video characteristic; and
transmitting, using the at least one cloud server, the metadata to one or more client devices in association with the video data, the transmitting causing the play back on the one or more client devices.

17. The system of claim 16, wherein the video is of a gameplay session, the metadata is transmitted to the one or more client devices in association with a video stream that comprises the video data, and the play back is during the gameplay session.

18. The system of claim 16, wherein the play back is in a video player that identifies the duration using the metadata.

19. The system of claim 16, wherein the video is of a gameplay session of a game and the at least one cloud server comprises at least one game server that hosts the gameplay session.

20. The system of claim 16, wherein the determining the one or more durations of predicted interest is based at least on analyzing input-device data representing input to one or more of a keyboard, a mouse, a microphone, a game-console controller, or a touchscreen of at least one client device of the one or more client devices.

* * * * *